United States Patent
Olcer

[15] 3,645,152
[45] Feb. 29, 1972

[54] VARIABLE SPEED MECHANISM

[72] Inventor: Behzat Olcer, 1810 Cumberland St., Rockford, Ill. 61103

[22] Filed: Apr. 27, 1970

[21] Appl. No.: 32,259

[52] U.S. Cl. ............................................. 74/682, 74/756
[51] Int. Cl. ..................................................... F16h 37/06
[58] Field of Search ........................... 74/682, 687, 756, 757

[56] References Cited

UNITED STATES PATENTS

| | | | |
|---|---|---|---|
| 3,242,769 | 3/1966 | Johnson | 74/682 |
| 2,973,669 | 3/1961 | Quigley | 74/687 |
| 2,924,122 | 2/1960 | Foster | 74/682 |
| 3,079,813 | 3/1963 | Quigley | 74/687 |

FOREIGN PATENTS OR APPLICATIONS

| | | | |
|---|---|---|---|
| 517,119 | 2/1955 | Italy | 74/682 |
| 620,723 | 3/1949 | Great Britain | 74/682 |

*Primary Examiner*—C. J. Husar
*Attorney*—McCanna, Morsbach, Pillote & Muir

[57] ABSTRACT

A controlled differential-gear system includes an input differential, an output differential, and an idler gear positioned between the two differentials to operate the output differential as a subtractive type when the input differential operates as an additive type. Brake means is arranged to brake one or the other side of the differentials to vary the output speed through an infinite range from maximum reverse, through zero, to maximum forward. Three arrangements of the differentials and two embodiments of the brake means are illustrated in the drawings.

7 Claims, 4 Drawing Figures

000
VARIABLE SPEED MECHANISM

BACKGROUND

The invention broadly pertains to machine elements and mechanisms. More particularly, the invention pertains to improved variable speed mechanisms of the type known as controlled differential-gear systems.

The prior art teaches that a differential-gear system alone will not produce a variable speed drive, but must be supplemented by some other variable speed mechanisms to control the relative rotation of various gears. This is commonly done by adding to the differential gearing a control mechanism based upon the principle of the V-belt or chain drive with adjustable cone pulleys. The relative capacity of a combined drive and differential gear system depends upon the ratio range of the drive and the required ratio range of the differential system. Differential gearing in this case is fundamentally a system where two driving members (at least one of which is variable in speed) combine their respective rotations and control the speed of the driven member. The differential design may be such that the driving members are additive or subtractive in their influence on the driven member. With an additive-type differential both driving members add their respective powers to the driven member as output power. With a subtractive-type differential the driving members subtract their respective powers to the driven member as output power. In the latter case there is circulating power which may exceed the output power. Circulating power exists when the sum of the input powers exceeds the output power.

The prior art also teaches the use of double differential-gear systems. With the double-differential type, the torques transmitted through the variable elements do not vary so widely as with the single-differential type. A double-differential system may use a V-belt or chain control mechanism. Assuming equal ratios in all the gear sets of such an arrangement, equal forward to reverse speed is obtainable by changing the variable speed transmission an amount or range either side of the mean position. By selecting unequal ratios in the gear sets, substantially any desired variable speed range may be obtained. It is desirable, however, to provide a variable speed mechanism without the use of a V-belt or chain control mechanism.

Another double-differential system is shown in U.S. Pat. No. 2,973,669 issued Mar. 7, 1961 to B. T. Quigley. That apparatus, however, utilizes a clutch arrangement to selectively effect neutral, forward or reverse operating ranges. It is desirable to provide a variable speed mechanism which can obtain neutral, forward and/or reverse operating ranges without the use of a clutch or similar apparatus.

SUMMARY

The present invention relates to improvements in variable speed mechanisms of the type known as controlled differential-gear systems.

It is an object of the present invention to provide a variable speed mechanism which has the above-mentioned desirabilities and yet is of simplified structure.

Another object is to provide a mechanism of the type described which employs a novel combination of gear connections and control means whereby an output shaft may rotate in either forward or reverse directions at variable output speeds and also has a neutral position where the output shaft is stationary.

Still another object is to provide a variable speed mechanism in which the output shaft can be rotated at an infinite number of speeds from forward through neutral to reverse.

Yet another object of the present invention is to provide apparatus in accordance with any of the above objects and which includes a pair of differentials so arranged that one operates as an additive differential and one as a subtractive differential.

These, and other objects and advantages of the present invention, will become apparent as the same becomes better understood from the following detailed description when taken with the accompanying drawings.

DRAWINGS

Figure 4:
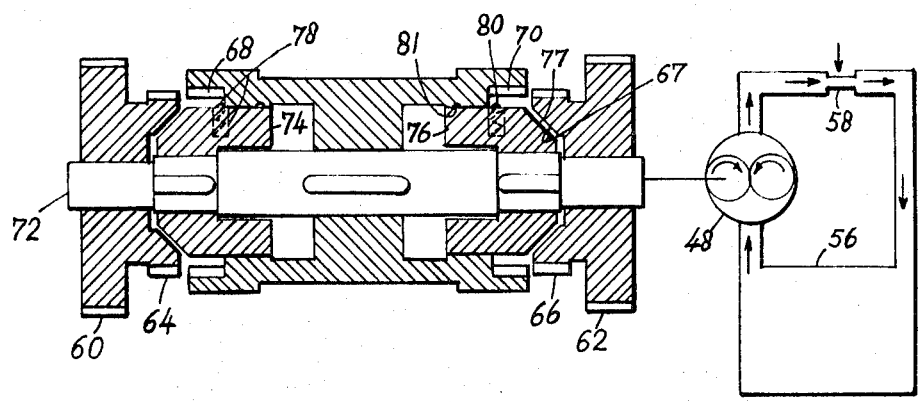

FIG. 4, on sheet two of the drawings, is a view, partly sectional and partly diagrammatic, of another braking apparatus usable in the invention and utilizing a single pump.

DESCRIPTION

As stated above, the apparatus of the present invention gives variable speed outputs in an infinite range covering reverse and forward speeds through neutral where the output is zero. This result is obtained by the combination of two differential-gear units and a braking means on at least one of the side members of the differential. In the embodiments illustrated, bevel gear differentials are used but it is to be understood that other types of differential units can also be used. The differentials are arranged so that when the braking means is in effect, the input differential functions as an additive type while the output differential functions as a subtractive type.

Reference is now made more particularly to the drawings which illustrate the best presently known mode of carrying out the invention and wherein similar reference characters indicate the same parts throughout the several views.

Figure 1:
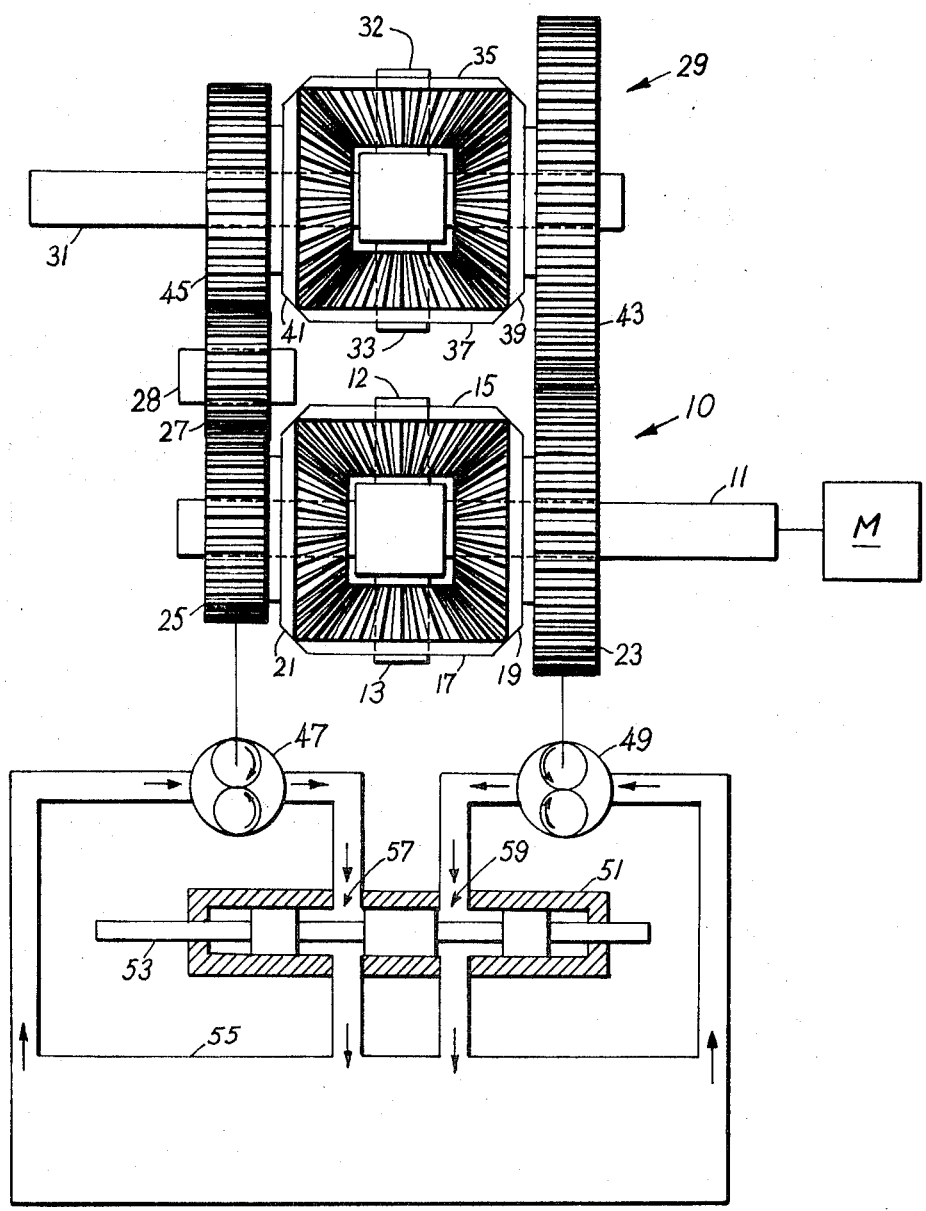
FIG. 1 is a diagrammatic view of one embodiment of the invention.

In the embodiment of FIG. 1, the input and output shafts are in side-by-side parallel relation. The input differential mechanism, generally designated 10, has a drive shaft or input shaft 11 rigidly connected with spider shafts 12 and 13. Planetary gear means in the form of spider gears 15 and 17 are rotatably mounted on the spider shafts 12 and 13, respectively, and movable through a planetary path. A bevel gear 19 is rigidly connected with a side gear 23 and both rotate freely around the input shaft 11. Similarly, a bevel gear 21 and a side gear 25 are also rigidly interconnected with each other and can freely rotate around the input shaft 11. As shown, bevel gears 19 and 21 are in mesh with the planetary gear means.

An output differential mechanism generally designated 29, has a driven shaft or output shaft 31 rigidly connected with spider shafts 32 and 33. Spider gears 35 and 37 are rotatably mounted on the shafts 32 and 33, respectively. In an arrangement similar to the input differential, a bevel gear 39 and side gear 43 are rigidly interconnected and freely rotate around the output shaft 31. Bevel gear 41 and side gear 45 are also rigidly interconnected and freely rotate around the output shaft.

The above-described differential units 10 and 29 are mounted in side-by-side relation with shafts 11 and 31 parallel. Side gears 23 and 43 mesh at one side while side gears 25 and 45 both mesh with an idler gear 27 rotatably mounted on shaft 28. Idler gear 27 is an important element of the present invention because of the totally different resulting function which is hereafter described in detail. Because of this idler gear, side gear 45 of the output differential 29 rotates in a direction opposite the direction of rotation of side gear 43. This makes the output differential a subtractive type differential as will hereafter become apparent.

A control system is combined with the above-described differentials. In the embodiment illustrated in FIG. 1, two hydraulic gear pumps 47 and 49 are arranged to be driven by the side gears 25 and 23 of the input differential. These pumps can also be driven by any gear in mesh with either of the side gears 25 and 23, for example side gears 45 and 43 of the output differential. Preferably, however, the pumps are connected to opposite sides of the above-described combination. The pressure sides of the two pumps 47 and 49 are connected by proper piping to openings 57 and 59 in a valve body 51. A plunger 53 is slidable within the body 51, as diagrammatically illustrated. Suitable piping connects the valve body with a reservoir 55 and the reservoir with the suction sides of the pumps 47 and 49. The design of the control valve is such that at any position of the plunger 53 only one port 57 or 59 will be closed. When one of the ports is completely closed or partially restricted, the other will remain open. In a neutral position, both ports can be completely open as shown in FIG. 1.

Figure 2:
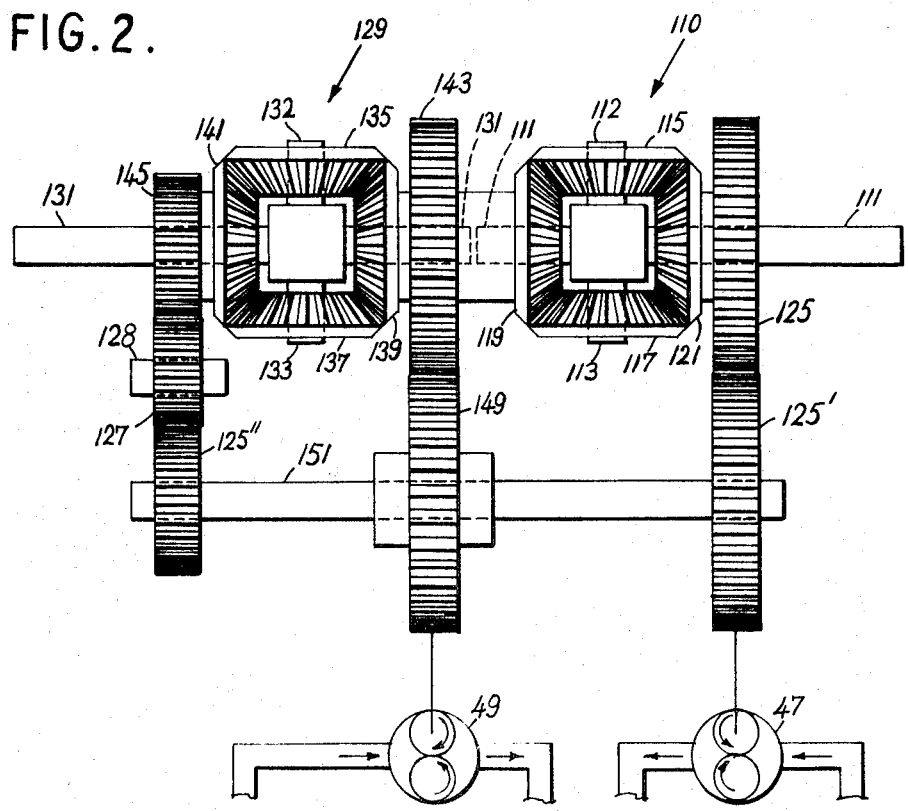
FIG. 2 is a diagrammatic view of a second embodiment of the invention.

FIG. 2 shows another embodiment of the present invention in which there is a coaxial arrangement of the input and output differentials. In this FIGURE, parts of the differential portion of the embodiment having the same function as that described above are given the same numerals of a series 100 higher than the similar functioning parts in FIG. 1. This will allow one skilled in the art to readily compare the functions while contrasting the structure. The input differential 110 has an input shaft 111 rigidly connected to spider shafts 112 and 113. Spider gears 115 and 117 are rotatably mounted on the respective shafts, as shown. Bevel gear 121 and side gear 125 are rigidly connected and can freely rotate around the input shaft 111. Bevel gear 119 of the input differential 110 is rigidly connected with a bevel gear 139 of an output differential unit 129 and to a side gear 143. An output shaft 131 and the input shaft 111 find bearing in this rigid combination of members of both differential units. The output shaft has a rigid connection to spider shafts 132 and 133 on which are rotatably mounted spider gears 135 and 137, respectively. A bevel gear 141, in mesh with both gears 135 and 137, is rigidly connected with a side gear 145 and the two gears are rotatably mounted on the output shaft 131. A third shaft 151 is mounted parallel to the input and output shafts of the differential units and has gears 125' and 125'' keyed thereto. In the embodiment illustrated, gear 125' is in mesh with gear 125. Gears 125'' and 145 are interconnected by an idler gear 127 rotatably mounted on shaft 128.

The previously described hydraulic control system is connected to this coaxial arrangement of the differential units in any convenient manner to achieve the aforedescribed function. That is, braking one side of the differential units or the other side thereof. In the embodiment illustrated, pump 49 is conveniently driven by gear 125 while pump 47 is conveniently driven by gear 143 as through a gear 149 conveniently rotatably mounted on shaft 151.

In considering the operation of the embodiments of FIGS. 1 and 2, we will first assume that the speed ratios of the various gears equal unity. More particularly, in FIG. 1 the speed ratio of gear 23 to gear 43 equals gear 25 to gear 45 which equals unity. Similarly, in FIG. 2 the speed ratio of gear 125 to 125' is equal to gear 125'' to gear 145 which is equal to unity. With such arrangements, the variable speed drives are capable of giving outputs from zero to a forward and reverse speed equal to the input speed as a maximum. For example, if a constant input of 1,000 r.p.m. is provided on shaft 11 or 111, output shaft 31 or 131 can be rotated at any speed from 1,000 r.p.m. in reverse to 1,000 r.p.m. in a forward direction using the above given gear ratios.

As examples of the intermediate speeds easily obtained, we will assume the same constant input of 1,000 r.p.m. on input shaft 11 of FIG. 1. Assume that plunger 53 is moved to a position to restrict the free rotation of pump 49 thereby limiting the rotation of gear 23 to 200 r.p.m. By the differential action, gear 25 will then be rotated at 1,800 r.p.m. Gear 43 will also be rotated at 200 r.p.m. but in an opposite direction; while gear 45 is rotated at 1,800 r.p.m. but in the same direction as gear 25. As explained above, differential 29 thus becomes a subtractive differential and the spider arms 32 and 33 with output shaft 31 will be rotated at one-half the sum of the speeds of gears 43 and 45. That is, one-half (1,800–200) or 800 r.p.m. By completely braking gear 23, the output speed will be 1,000 r.p.m. Conversely, by completely braking gear 25 the output speed will be minus 1,000 r.p.m. If gear 25 is braked to 200 r.p.m., the output speed will be minus 800 r.p.m. If neither gear 23 nor gear 25 is braked, the output speed will be zero.

If it is desired that there be a change in maximum output speed, the aforementioned gear ratios can be changed. For example, with an input speed of 1,000 r.p.m. on shaft 11 and a desired maximum output speed of 500 r.p.m. on shaft 31, the speed ratios of the gears in FIG. 1 should be as follows: gear 23 to gear 43 equals gear 25 to gear 45 equals one-half. In this manner, the apparatus can be designed to accommodate any desired ratio of input speed to maximum forward or reverse output speed.

In FIG. 2, however, a different result is achieved. It will be remembered that spur gears 119 and 139 are connected for simultaneous rotation. It is not, therefore, possible to have a gear reduction between these two bevel gears. As a consequence, if the speed ratio of gear 125 to gear 125' or of gear 125'' to gear 145 is made one-half, the speed range will be minus 500 to 1,000 r.p.m. with a 1,000 r.p.m. input. If both of the aforementioned ratios are made one-half, the speed range will be minus 250 to 1,000 r.p.m. These may be desirable speed ranges for certain applications. However, if it is desired to utilize a coaxial arrangement of the input and output shafts and also have a speed change from the input speed to the maximum output speed with the forward and reverse maximums equal, the embodiment of FIG. 2 cannot be used.

Figure 3:
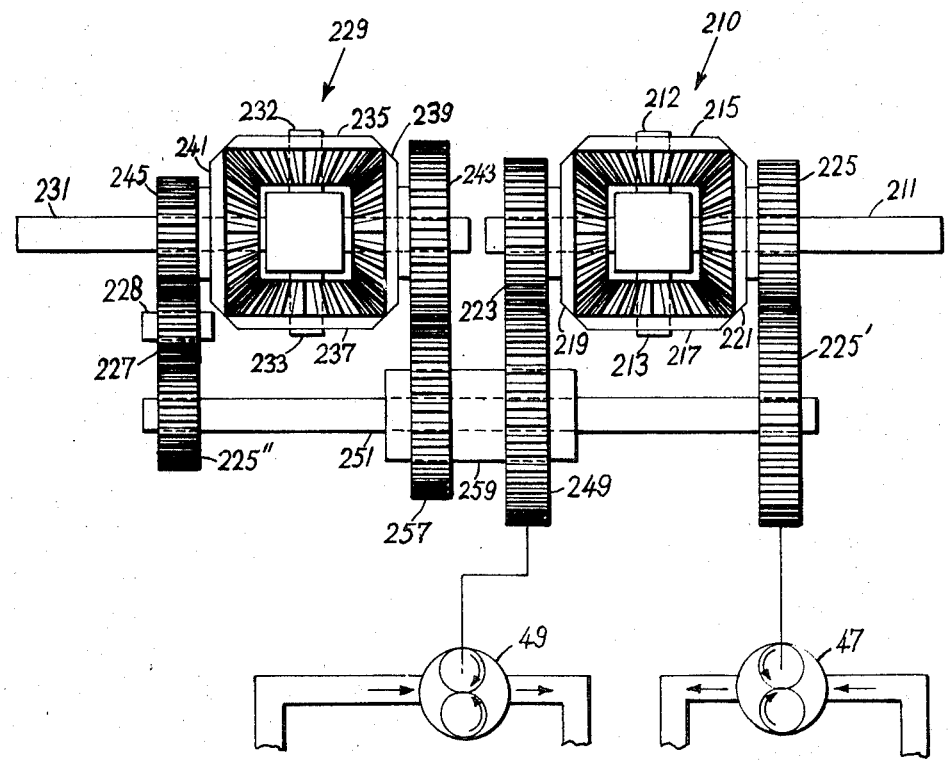
FIG. 3 is a diagrammatic view of a third embodiment of the invention.

FIG. 3 is an improved design of the coaxial combination which can obtain a speed range having equal forward and reverse speeds but of a different maximum from the input speed. The improvement in FIG. 3 is accomplished by eliminating the rigid interconnection between the differential units. In the embodiment illustrated, similar parts to that in FIG. 1 are indicated by the same numerals of a series 200 higher.

In the embodiment illustrated in FIG. 3, two differential units 210 and 229 are mounted coaxially. Input differential 210 has an input shaft 211 and spider gears 215 and 217 rotatably mounted on spider arms 212 and 213, respectively. Bevel gear 219 and side gear 223 are rigidly connected as are bevel gear 221 and side gear 225. Spider gears 235 and 237 of the output differential 229 are rotatably mounted around the spider arms 232 and 233 of the output shaft 231. A bevel gear 239 is rigidly connected to side gear 243 and bevel gear 241 is rigidly connected to side gear 245. A shaft 251 is mounted in parallel to input shaft 211 and output shaft 231. A gear 225' is keyed on shaft 251 and in mesh with gear 225. Another gear 225'' is also keyed to shaft 251 and is in mesh with an idler gear 227 which also meshes with gear 245. Gears 249 and 257, in mesh with gears 223 and 243 respectively, are rigidly mounted on a sleeve 259 which is rotatably mounted on shaft 251. The aforedescribed control means can be connected in any desired manner and, in the embodiment shown, is operatively connected to gear 225' and gear 249. With this arrangement, the operative characteristics in FIG. 1 is duplicated with the shafts in a coaxial arrangement.

A more complete description of the operation of the aforedescribed embodiments will now be given. Assume the plunger 53 of the control valve is set in the position shown in FIG. 1 with both ports 57 and 59 completely open. The variable speed drive will then have an output of zero. For example, when the input shaft 11 is rotated with a constant r.p.m. as by an electric motor M, both side gears 23 and 25 will be rotated in the same direction and with the same speed as the input. In this case the input differential unit will act as a simple pinion and none of its rotating members will move relative to the others. The rotation of side gear 23 will be transmitted to side gear 43 and the rotation of side gear 25 will be transmitted to side gear 45 via idler gear 27. Assuming equal gear ratios, the rotation of the side gears 43 and 45 will be equal but opposite. This means bevel gears 39 and 41 will rotate with equal but opposite speeds. Spider gears 35 and 37 will also rotate around the spider shafts without any rolling action on any of the bevel gears 39 and 41. The output at shaft 31 will then be zero. When the ports 57 and 59 are completely open, the hydraulic fluid in the system will be freely circulated without any build up of pressure. In other words, no braking effect will be applied to the side gears 23 or 25.

When the plunger 53 is moved to the right and port 59 is closed, the circulation of pump 49 will be stopped and side gear 23 will be held stationary along with bevel gear 19. This will cause a doubling of the speed of bevel gear 21 and side gear 25. This speed will be transmitted to side gear 45 and to bevel gear 41. The spider gears 35 and 37 will start to roll on bevel gear 39 which is also held stationary by means of the rigid connection with side gear 43 which is in mesh with the braked side gear 23. The rolling spider gears 35 and 37 will carry the spider shafts and impart rotation to output shaft 31. The speed of the output shaft will be equal to half the speed of bevel gear 41 and the direction of rotation will be in the same direction as the input.

When the port 59 is partially restricted by the plunger 53, pressure will buildup between the outlet of the pump 49 and the port 59 creating a braking effect on the side gears 23 and 43 and decreasing their speeds. One example of this is given above. By various settings of the control plunger 53, various braking effects can be accomplished and an infinite number of output speeds achieved. When port 59 is restricted, the output speed is always in the same direction as the input speed.

When the above-described control is applied to the port 57, the braking effect will be applied on side gear 25 thereby reversing the direction of the output shaft 31.

The above-described embodiments of the variable speed drive will react to the control system and a smooth and nearly instantaneous change between reverse and forward is possible. It is to be understood that the speed of changing the direction of rotation will depend on the inertia of the load applied and other variable factors.

When the speed ratios of the gears are changed, the output torque will be increased or decreased proportionately as the output speed range decreases or increases, respectively.

In a manner similar to that described for the embodiment of FIG. 1, the embodiments shown in FIGS. 2 and 3 are operatively identical. All of the embodiments are effective by using a schematically shown hydraulic control system having two gear pumps, one of which is always ineffective insofar as the braking action of the other is concerned. It is possible, therefore, to have a single pump and one hydraulic circuit arranged with a clutch mechanism to connect it to one side or the other. In such a case, the hydraulic circuit will have a simpler flow restricting valve.

It will be understood that the load applied on the output shaft 31, 131 or 231 must be overcome to be able to obtain a rotation. This load can be variable or constant in nature. In any case, as long as it remains within the capacity of the variable speed mechanism, depending on the magnitude of the load, the output motion will occur whenever the algebraic sum of the powers of the side members of the output differential equals the power required to drive the load. Since this above-mentioned algebraic sum is a function of the input power and the braking power, it will always be determined by the load applied, and in case of variable loads the control valve settings will vary accordingly to obtain the same r.p.m. at different load conditions. Once the motion starts at a certain valve setting the remaining valve stroke will still cover the infinitely variable speed range in both reverse and forward direction, as long as the braking and driving means are selected according to the design capacity. Therefore, the subject variable speed mechanism is load responsive. This fact gives the mechanism possibilities for use with variable input speeds (such as engines). In such a case the variable speed mechanism can be used as an automatic transmission.

FIG. 4 illustrates another control unit combined with a synchromesh gear clutch. As shown, shaft 72 is positioned parallel with input shaft 11, 111 or 211. Gears 60 and 62, connected with gears 64 and 66, respectively, are rotatably mounted at opposite ends of the shaft 72. If utilized in FIG. 1, gear 60 would be in mesh with gear 25 and gear 62 in mesh with gear 23. Internal gears 68 and 70 are interconnected and keyed or splined on the shaft 72, but arranged for sliding movement so that they can be selectively engaged with gear 64 and 66. Two friction discs 74 and 76 are also keyed or splined on shaft 72 and also arranged for sliding movement along the shaft. Ball-type detents 78 and 80 are mounted on discs 74 and 76, respectively. When the common body of gears 68 and 70 is moved to the right, detent 80 is engaged and moves the discs 76 to the right. They will move together until the friction surface 77 contacts the friction surface 67. When this contact occurs, the rotation of gear 66 is transmitted to shaft 72 through discs 76. Gear 70 rotates because of its blind connection to the shaft. When gear 66 and gear 70 have obtained the same r.p.m. a further movement of gear 70 will overcome the spring-loading of the detent 80 and gears 70 and 66 will become meshed. The detent 80 can snap into a matching groove 81 and hold the gears 66 and 70 in meshed position. When the sliding movement is to the left, gears 64 and 68 can be meshed.

When rotated, shaft 72 will rotate a hydraulic pump 48 and pump fluid from a reservoir 56 through suitable conduits to a control valve 58. Variable speed outputs can be obtained by different setting of the valve 58.

When a reverse rotation of the output shaft is required, the left-hand side gears of the differentials must be braked. Preferably the gears 60 and 62 are in mesh with gears of the input differential so that, in both positions, shaft 72 will rotate in the same direction.

Any of the aforementioned pumps 47–49 can be replaced by a mechanical brake, a magnetic particle brake, or any other suitable apparatus to achieve an adjustable braking effect whenever required.

With this invention the additive-type input differential adds the braking power to the input power and gives it as an output power at its driven side member. The meshing side gears transmit this power to the subtractive-type output differential. The output differential is a subtractive-type by means of the idler gear which causes the side members of the output differential to rotate in opposite directions, while the side gears of the input differential rotate in the same direction.

While several embodiments of the invention have herein been illustrated and described, this has been done by way of illustration and not limitation, and the invention should not be limited except as required by the scope of the appended claims.

I claim:

1. In a variable speed mechanism including a drive shaft; a driven shaft; and an input differential mechanism including planetary gear means arranged to be driven through its planetary path by the drive shaft, and first and second gears in mesh with the planetary gear means; the improvement comprising: an output differential mechanism including second planetary gear means arranged to drive the driven shaft as it moves through its planetary path, and third and fourth gears in mesh with the second planetary gear means; first means operatively connecting the first and third gears for rotation in opposite directions; second means operatively connecting the second and fourth gears for rotation in the same direction; whereby the input differential is an additive differential and the output differential is a subtractive differential; and brake means selectively operative on both of the first and second means to retard the rotation thereof and vary the speed of the drive shaft from maximum reverse speed through zero output to maximum forward speed, the brake means comprising a synchromesh gear clutch apparatus having first and second gears each in mesh with one of the first and second means and so constructed and arranged that its gears always rotate in the same direction, and the synchromesh gear clutch apparatus including a slidable gear selectively engageable with the synchromesh gear clutch apparatus first and second gears, and means for synchronizing the rotation of the slidable gear with the first and second gears prior to said engagement.

2. A variable speed mechanism as set forth in claim 1 wherein the differential mechanisms are arranged in side-by-side relation, the first means includes two gears directly in mesh so that the first and third gears rotate in opposite directions, and the second means includes two gears and an intermediate idler gear so that the second and fourth gears rotate in the same direction.

3. A variable speed mechanism as set forth in claim 1 wherein the drive shaft and driven shaft are coaxially arranged; the differential mechanisms are arranged in tandem; and at least one of the first and second means includes a third shaft disposed parallel to the drive and driven shafts, and gears carried on the third shaft for rotation therewith.

4. A variable speed mechanism as set forth in claim 3 wherein the other of the first and second means includes a fourth shaft disposed parallel to the drive and driven shafts, and gears carried on the fourth shaft for rotation therewith.

5. A variable speed mechanism including an input shaft; an output shaft coaxial with the input shaft; an input differential mechanism including at least one planetary gear driven through its planetary path by the input shaft, and first and second gear means in mesh with the planetary gear; an output differential mechanism including at least one other planetary gear for driving the output shaft as it moves through its planetary path, and third and fourth gear means in mesh with the other planetary gear; said differential mechanisms being arranged in tandem; first interconnecting means for interconnecting said first and third gear means for rotation in opposite directions; second interconnecting means for interconnecting said second and fourth gear means for rotation in the same direction; one of the first and second interconnecting means including a third shaft disposed parallel to the input and output shafts and gears carried on the third shaft for rotation therewith; one of the gear means including an idler gear to achieve the rotational difference; whereby the input differential is an additive differential and the output differential is a subtractive differential; and selectively operable means for braking at least one of the gear means to retard the rotation thereof and vary the speed of the driven shaft.

6. An apparatus according to claim 5 wherein the differential mechanisms are bevel gear differentials, the first and second gear means each include a bevel gear and a spur gear both rotatably mounted on the input shaft and both interconnected for simultaneous rotation, and the third and fourth gear means each include a bevel gear and a spur gear both rotatably mounted on the output shaft and interconnected for simultaneous rotation.

7. An apparatus according to claim 6 wherein the spur gears of the first and third gear means are meshed, and wherein the idler gear is meshed with the spur gears of the second and fourth gear means.

* * * * *